(12) United States Patent
Kim et al.

(10) Patent No.: US 8,724,559 B2
(45) Date of Patent: May 13, 2014

(54) METHOD AND APPARATUS FOR TRANSMISSION IN BUNDLING MODE IN WIRELESS COMMUNICATION NETWORK

(75) Inventors: Soeng Hun Kim, Suwon-si (KR);
Gert-Jan Van Lieshout, Apeldoorn (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 606 days.

(21) Appl. No.: 12/691,389

(22) Filed: Jan. 21, 2010

(65) Prior Publication Data

US 2010/0182973 A1  Jul. 22, 2010

(30) Foreign Application Priority Data

| Jan. 21, 2009 | (KR) | 10-2009-0004919 |
| Jan. 23, 2009 | (KR) | 10-2009-0005763 |
| Jan. 29, 2009 | (KR) | 10-2009-0007068 |
| Feb. 4, 2009 | (KR) | 10-2009-0008976 |
| Mar. 12, 2009 | (KR) | 10-2009-0021281 |

(51) Int. Cl.
*H04W 4/00* (2009.01)
*H04W 52/36* (2009.01)

(52) U.S. Cl.
CPC ............................... *H04W 52/365* (2013.01)
USPC .......................................................... 370/329

(58) Field of Classification Search
CPC .................................................. H04W 52/36
See application file for complete search history.

(56) References Cited

U.S. PATENT DOCUMENTS

| 2006/0286994 | A1 | 12/2006 | Kwak et al. |
| 2007/0019668 | A1* | 1/2007 | Lee et al. ................ 370/458 |
| 2008/0051028 | A1 | 2/2008 | Jung et al. |
| 2008/0080423 | A1 | 4/2008 | Kolding et al. |
| 2009/0104916 | A1* | 4/2009 | Rosa et al. .............. 455/453 |
| 2009/0109907 | A1* | 4/2009 | Tsai et al. ................ 370/329 |
| 2010/0158147 | A1* | 6/2010 | Zhang et al. ............ 455/522 |

FOREIGN PATENT DOCUMENTS

| KR | 10-2006-0104059 A | 10/2006 |
| KR | 10-2008-0018551 A | 2/2008 |

OTHER PUBLICATIONS

Triggers for power Headroom reports in EUTRAN Uplink, Feb. 2008, 3GPP RAN WG1 #52, pp. 1-2.*
Way forward on power control of PUSCH, Jan. 2007, 3GPP RAN WG1 #49, p. 1.*

* cited by examiner

*Primary Examiner* — Steven H Nguyen
(74) *Attorney, Agent, or Firm* — Jefferson IP Law, LLP

(57) ABSTRACT

A method and apparatus for a transmission in a bundling mode are provided to prevent a conflict between a bundling transmission resource and other transmission resource in a wireless communication network. A bundling transmission method includes determining whether there is a transmission conflicting with a bundling transmission induced by an uplink grant regarding uplink transmission resources. If it is determined that there is a conflicting transmission, the method disregards at least one of the bundling transmission and the conflicting transmission. A bundling transmission apparatus includes a retransmission unit and a transmission control unit, which are configured to execute the bundling transmission method.

16 Claims, 13 Drawing Sheets

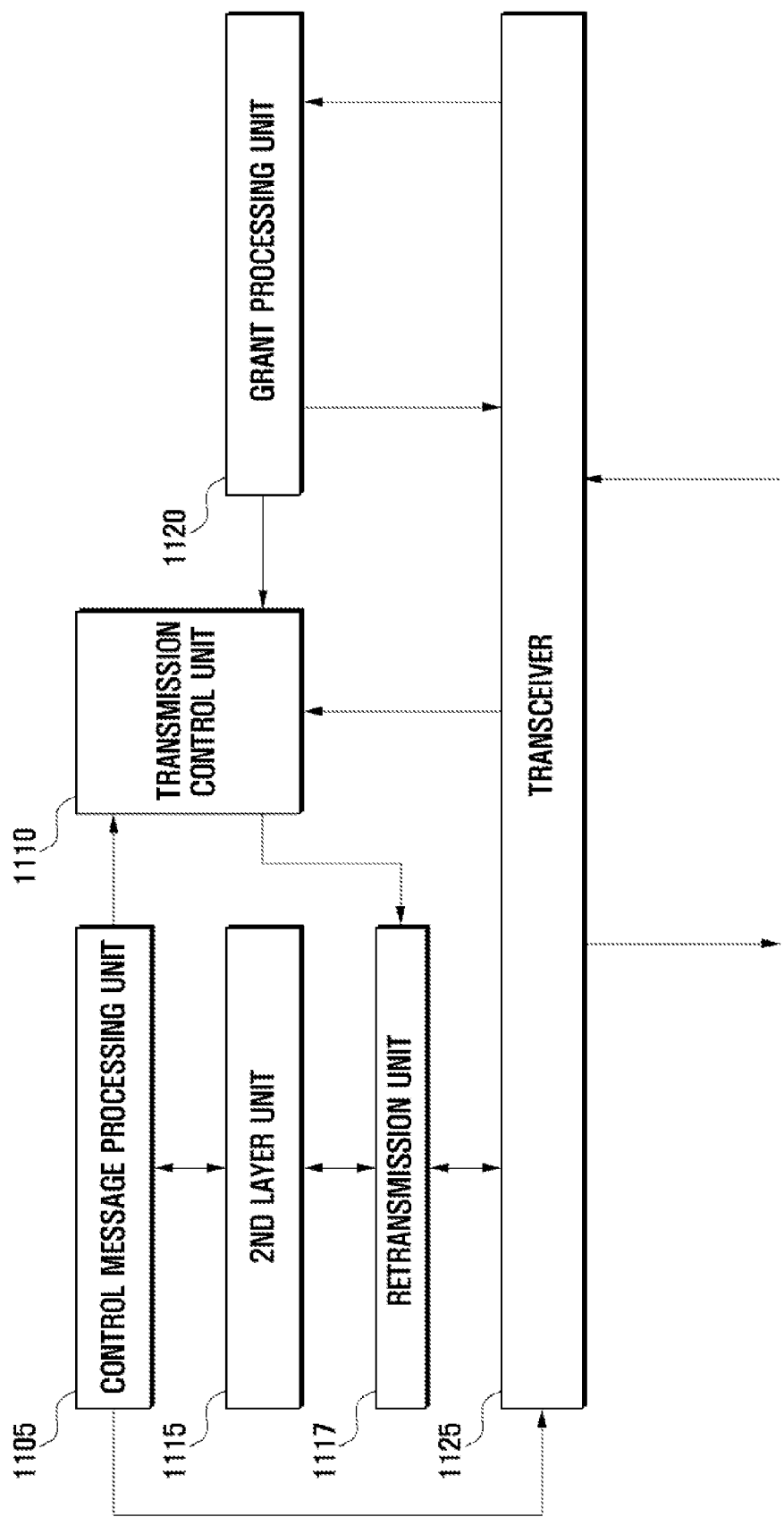

METHOD AND APPARATUS FOR TRANSMISSION IN BUNDLING MODE IN WIRELESS COMMUNICATION NETWORK

PRIORITY

This application claims the benefit under 35 U.S.C. § 119(a) of Korean patent applications filed in the Korean Intellectual Property Office on Jan. 21, 2009, Jan. 23, 2009, Jan. 29, 2009, Feb. 4, 2009 and Mar. 12, 2009 and respectively assigned Serial Nos. 10-2009-0004919, 10-2009-0005763, 10-2009-0007068, 10-2009-0008976 and 10-2009-0021281, the entire disclosures of all of which are hereby incorporated by reference.

BACKGROUND OF THE INVENTION

1. Field of the Invention

The present invention relates to transmission technology in a bundling mode in a wireless communication network. More particularly, the present invention relates to a method and apparatus for a reliable transmission in a bundling mode with reduced transmission errors.

2. Description of the Related Art

A Universal Mobile Telecommunication Service (UNITS) system is known as the $3^{rd}$ generation asynchronous mobile communication system which is based on Global System for Mobile Communications (GSM) and General Packet Radio Services (GPRS) and which employs Wideband Code Division Multiple Access (WCDMA).

These days the $3^{rd}$ Generation Partnership Project (3GPP), which is in charge of UMTS standardization, has discussed Long Term Evolution (LTE) as a next generation mobile communication system of the UMTS system. LTE is a high speed packet based communication technology having a maximum transmission rate of 100 Mbps. To attain commercialization in the 2010, various technical issues in connection with LTE are being debated such as a reduction in nodes on communication lines through a simplified network structure, an approximation of wireless protocols to a wireless channel, etc.

The LTE system may use a bundling transmission technique. A bundling transmission allows a user terminal to perform an n-time repeated delivery of the same data through transmission resources allocated thereto. Therefore, a bundling transmission may decrease deterioration in quality due to insufficient transmission power.

BRIEF SUMMARY OF THE INVENTION

An aspect of the present invention is to address at least the above-mentioned problems and/or disadvantages and to provide at least the advantages described below. Accordingly, an aspect of the present invention is to provide a method and apparatus for transmission in a bundling mode in order to prevent a conflict between a bundling transmission resource and another transmission resource in a wireless communication network.

In accordance with an aspect of the present invention, a bundling transmission method in a terminal is provided. The method includes determining whether there is a transmission conflicting with a bundling transmission induced by an uplink grant regarding uplink transmission resources, and, if there is a conflicting transmission, disregarding at least one of the bundling transmission and the conflicting transmission.

In accordance with another aspect of the present invention, a bundling transmission apparatus in a terminal is provided. The apparatus includes a retransmission unit for performing a retransmission process based on uplink transmission resources allotted by an uplink grant, and a transmission control unit for determining whether there is a transmission conflicting with a bundling transmission induced by an uplink grant regarding uplink transmission resources, and, if there is a conflicting transmission, to disregard at least one of the bundling transmission and the conflicting transmission.

Exemplary embodiments of the present invention can address a problem in that transmission resources conflict with each other in a bundling transmission.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 13 is a block diagram which illustrates an apparatus for a bundling transmission of a user terminal according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Furthermore, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

At the outset, an exemplary wireless communication system in accordance with the present invention will be described.

Figure 1:
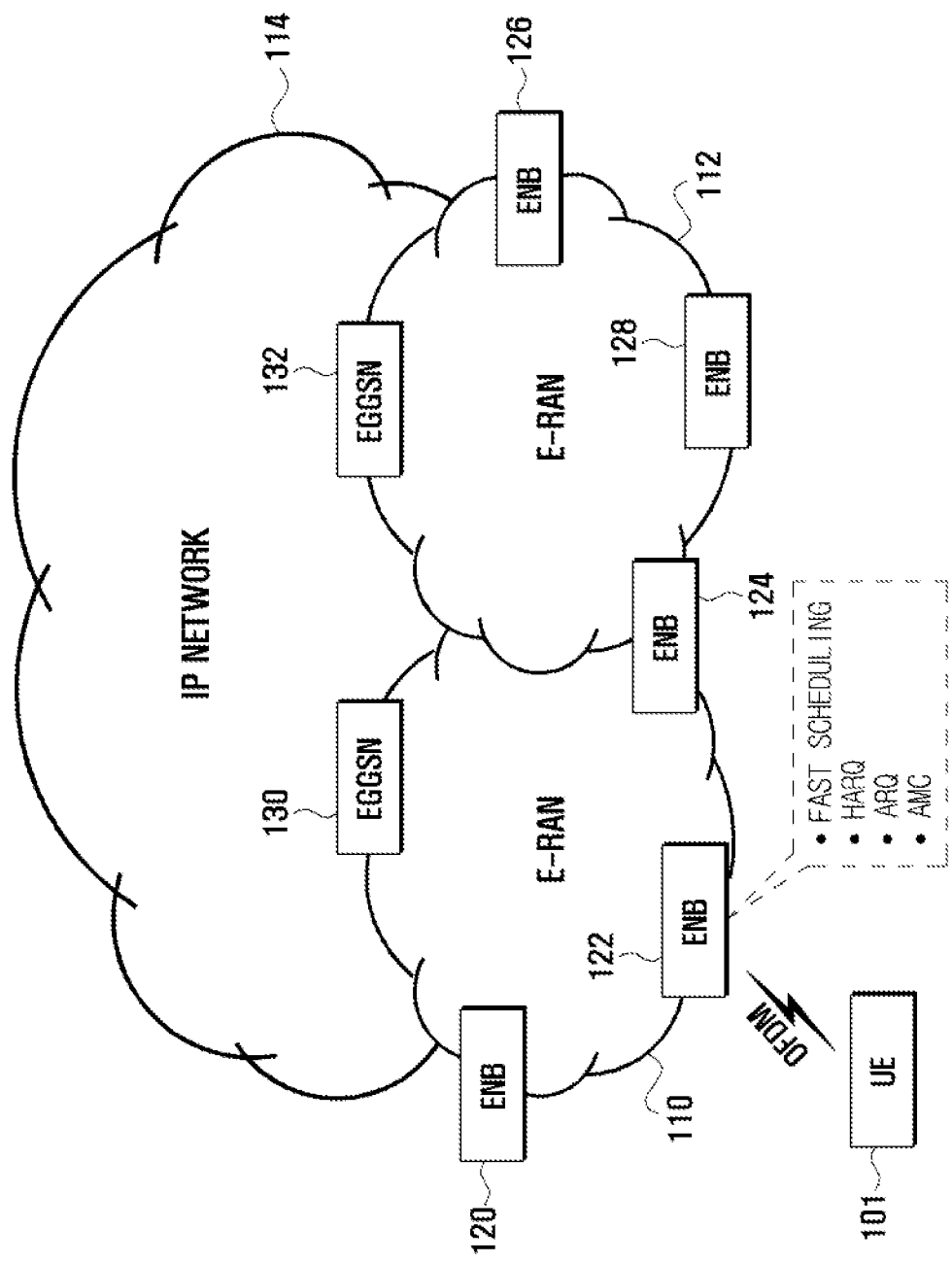
FIG. 1 illustrates a wireless communication system according to an exemplary embodiment of the present invention.

FIG. 1 illustrates a wireless communication system according to an exemplary embodiment of the present invention.

Referring to FIG. 1, a wireless communication system includes a first Evolved Radio Access Network (E-RAN) 110 and a second E-RAN 112. Each E-RAN 110 and 112 has a two-node architecture composed of Evolved Node Bs (ENBs) 120, 122, 124, 126 or 128 and Evolved Gateway General Packet Radio Service (GPRS) Serving Nodes (EGGSNs) 130 or 132. User Equipment (UE) 101 accesses an Internet Protocol (IP) network 114 through the E-RAN 110 or 112.

Each of the ENBs 120, 122, 124, 126 or 128 corresponds to a conventional Node B and may be connected with the UE 101 through a wireless channel. However, the ENBs 120, 122, 124, 126 or 128 perform more complicated functions than a conventional Node B. Normally, next generation wireless communication systems may route all user traffic, including real time services such as Voice over IP (VoIP), through a shared channel. Therefore, equipment is required which gathers circumferential information about the UEs 101 and performs their scheduling. Each individual ENB 120, 122, 124, 126 or 128 takes charge of such scheduling, while controlling a number of cells.

In order to realize the maximum transmission rate of 100 Mbps, wireless communication systems usually employ Orthogonal Frequency Division Multiplexing (OFDM) as a radio access technology using a 20 MHz bandwidth. In addition, wireless communication systems may adopt an Adaptive Modulation and Coding (AMC) technique which determines a modulation scheme and a channel coding rate according to channel conditions of the UE 101.

Hereinafter, the E-RAN 110 or 112 including the ENBs 120, 122, 124, 126 or 128 and the EGGSNs 130 or 132 will be referred to as a base station, whereas the UE 101 will be referred to as a terminal. Although the base station refers in general to an ENB 120, 122, 124, 126 or 128, in an exemplary implementation, parts of the base station may include the EGGSN 130 or 132.

The base station receives various reports from terminals in order to execute the allocation of transmission resources, namely, to perform scheduling. Reports sent by a terminal may include a Buffer Status Report (BSR) that includes information on the amount and kind of data stored in the terminal, and a Power Headroom Report (PHR) that includes information on remaining transmission power in the terminal.

The BSR refers to information that indicates by priority the amount of data stored in the terminal. If particular conditions are satisfied, the terminal creates the BSR and sends it to the base station. The above particular conditions may include, for example, a case in which new data is created in the terminal, a case in which a given time elapses after the last transmission of the BSR, etc.

The PHR refers to information which indicates remaining power capable of being used for uplink data transmission in consideration of current channel conditions of the terminal. In other words, the PHR is equal to a difference between the maximum transmission power and a specific transmission power required for the terminal when uplink transmission is carried out using a Modulation and Coding Scheme (MCS) and transmission resources allocated to the terminal.

Using the PHR received from the terminal the base station may determine the maximum MCS level and the amount of transmission resources to be allotted to the terminal. More particularly, the base station may transmit a control message to switch a transmission mode depending on the received PHR. Here, the transmission mode includes a bundling mode and a non-bundling mode.

The terminal determines whether to send the PHR based on the reference amount of transmission resources (REFERENCE_RB_NB), the reference level of MCS (REFERENCE_MCS), and a reference value (R), all of which are received from the base station.

Hereinafter, a specific packet size that requires efficient transmission even under unfavorable conditions due to insufficient transmission power will be referred to as a reference packet size. In addition, a specific amount of transmission resources and a specific level of MCS, both of which correspond to the reference packet size, will be referred to as the reference amount of transmission resources (REFERENCE_RB_NB) and the reference level of MCS (REFERENCE_MCS), respectively. Also, a reference value (R) is a given value used for determining whether to transmit the PHR. A related description will be given below.

An exemplary process of determining whether to transmit the PHR will be described hereinafter.

The base station transmits the reference amount of transmission resources (REFERENCE_RB_NB), the reference level of MCS (REFERENCE_MCS), and the reference value (R) to the terminal. Then, using both the reference amount of transmission resources (REFERENCE_RB_NB) and the reference level of MCS (REFERENCE_MCS), the terminal determines the required reference transmission power (REFERENCE_P). Hereinafter, a required transmission power determined from the reference amount of transmission resources (REFERENCE_RB_NB) and the reference level of MCS (REFERENCE_MCS) will be referred to as the required reference transmission power or required reference transmission output (REFERENCE_P).

The required reference transmission power (REFERENCE_P) is determined through the following Equation 1.

$$P\ \text{REQUIRED} = 10\ \log + Po + \alpha \times PL + \text{delta\_mcs} + f(\text{delta\_}i) \quad \text{Eq. (1)}$$

In Equation 1, the term 'Po' refers to a positive real number signaled by the base station in a call establishing step. The term 'PL' refers to a path loss determined by the terminal, and the term 'delta_mcs' refers to an arbitrary integral number predefined for each MCS level. The value of 'delta_mcs' increases as the value of MCS increases. The term '$\alpha$' refers to a coefficient for correcting a path loss and is signaled by the base station. The term 'f(delta_i)' refers to a value obtained when uplink power control commands that the terminal receives up to the present are input into a given function f( ). The term 'n' refers to the amount of given transmission resources, namely, the number of transmission resource blocks.

The terminal derives two terms 'delta_mcs' and 'n' from the reference amount of transmission resources (REFERENCE_RB_NB) and the reference level of MCS (REFERENCE_MCS), and determines the required reference transmission power (REFERENCE_P) through Equation 1. The terminal determines whether to transmit the PHR by comparing the required reference transmission power (REFERENCE_P) with the product of the maximum transmission power and the reference value (R).

The base station may instruct the terminal to switch a transmission mode, depending on the PHR the terminal reports. In an exemplary implementation, the terminal may have two or more transmission modes, including a bundling mode and a non-bundling mode.

Bundling transmission is a technique that allows the terminal to repeat delivery of the same data n-times through transmission resources allocated thereto and thereby decreases deterioration in quality due to insufficient transmission power. Exemplary embodiments of the present invention define a condition of creating allowable transmission information, such as the PHR, which is optimized to the bundling transmission, in order to determine whether the terminal and the base station should apply the bundling transmission technique for a certain period of time.

Bundling of the transmission may guarantee an efficient transmission of a packet even in a terminal with low transmission power. For example, a terminal providing a VoIP service should be able to immediately transmit a packet with a size corresponding to a single voice frame without dividing it. Even in a case in which a VoIP service is not implemented, the terminal should be able to efficiently transmit a reporting message about changes in cell measurement results.

As discussed heretofore, the terminal, which is in a non-bundling mode, is changed to a bundling mode by rapidly sending the PHR when circumstances requiring a bundling transmission occur. Additionally, the terminal, which is in a bundling mode, is changed to a non-bundling mode by rapidly sending the PHR when circumstances no longer require the bundling transmission.

First Exemplary Embodiment

Figure 2:
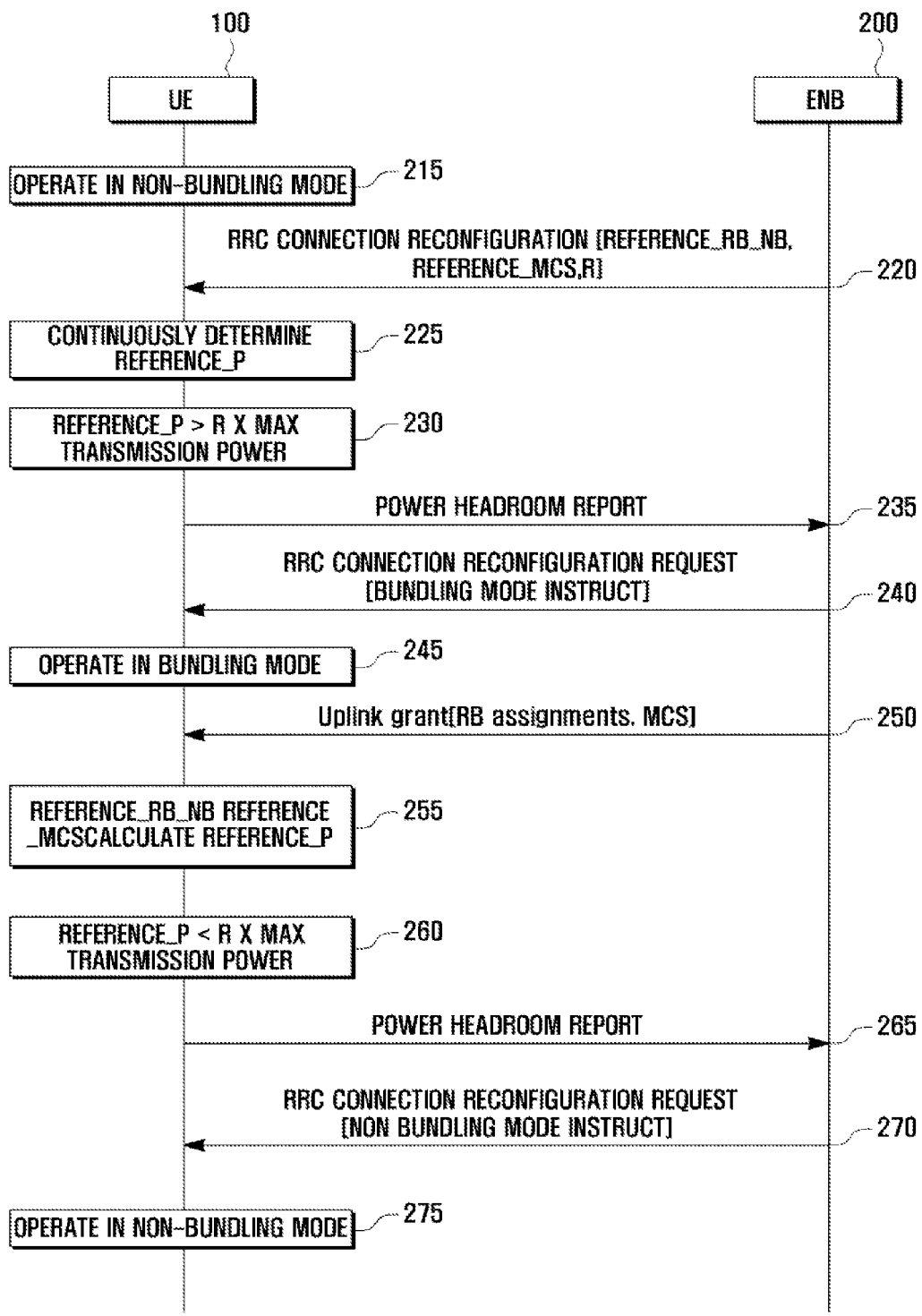
FIG. 2 is a flow diagram which illustrates a method for a bundling transmission according to a first exemplary embodiment of the present invention.

FIG. 2 is a flow diagram which illustrates a method for a bundling transmission according to a first exemplary embodiment of the present invention.

Referring to FIG. 2, a terminal 100 operates in a non-bundling mode, namely, a normal mode rather than a bundling mode in step 215.

A base station 200 transmits the reference amount of transmission resources (REFERENCE_RB_NB), the reference level of MCS (REFERENCE_MCS), and the reference value (R) to the terminal 100 through a Radio Resource Control (RRC) connection reconfiguration message in step 220.

In step 220, in view of the kinds of services used by the terminal 100, the base station 200 determines the size of a packet which requires an efficient transmission even though the terminal has poor transmission power. Also, the base station 200 determines the reference amount of transmission resources (REFERENCE_RB_NB) and the reference level of MCS (REFERENCE_MCS) from the determined packet size.

The above packet size (i.e., the reference packet size) can be replaced with a combination of the amount of transmission resources and the MCS level. The reference amount of transmission resources (REFERENCE_RB_NB) and the reference level of MCS (REFERENCE_MCS) can therefore be obtained from the reference packet size through a normal replacement process.

Generally, when receiving an uplink grant used to allot uplink resources, the terminal 100 determines a required transmission power from the number of allotted transmission resource blocks and the MCS level. However, according to an exemplary embodiment of the invention, the terminal 100, which operates in a non-bundling mode, continuously determines the required reference transmission power (REFERENCE_P) from the reference amount of transmission resources (REFERENCE_RB_NB) and the reference level of MCS (REFERENCE_MCS) in step 225.

Contrary to a case of a non-bundling mode, the terminal 100, which operates in a bundling mode, determines the required reference transmission power (REFERENCE_P) only when receiving an uplink grant.

After the required reference transmission power (REFERENCE_P) is determined, the terminal 100 compares the required reference transmission power (REFERENCE_P) with the product of the maximum transmission power and the reference value (R) in step 230. It will be supposed that the required reference transmission power (REFERENCE_P) is greater than the product of the maximum transmission power and the reference value (R). This indicates that the terminal requires transmission power corresponding to R tunes the maximum transmission power in order to transmit a packet having the reference size. In other words, it indicates that there is a need to switch a transmission mode from a non-bundling mode to a bundling mode.

Here, the term 'R' is proportional to the number of continuous transmissions used in a bundling mode. That is, the reference value (R) will increase as the number of continuous transmissions used in a bundling mode increases. Similarly, the reference value (R) will decrease as the number of continuous transmissions used in a bundling mode decreases.

If the required reference transmission power (REFERENCE_P) is greater than R times the maximum transmission power, the terminal 100 takes steps necessary for transmission of the PHR.

More specifically, the terminal 100 sends a notification to the base station 200 in order to let the base station know that there is data to be transmitted through given uplink transmission resources. After receiving an uplink grant used to allot uplink resources from the base station 200, the terminal 100 determines the PHR and transmits a packet containing the PHR through allotted transmission resources in step 235.

The base station 200 receiving the PHR becomes aware that the terminal 100 needs R times the maximum transmission power in order to transmit a packet with the reference size. Therefore, the base station 200 sends a control message (RRC CONNECTION RECONFIGURATION REQUEST) to the terminal 100 in step 240. This control message refers to instructions for the terminal 100 to execute a bundling mode. Therefore, the terminal 100 receiving the control message switches a transmission mode to a bundling mode in step 245.

On the other hand, switching from a bundling mode to a non-bundling mode is not a matter of urgency. Therefore, the terminal 100 which operates in a bundling mode determines the required reference transmission power (REFERENCE_P) only if receiving an uplink grant. That is, when the terminal 100 receives an uplink grant at any time, for example in step 250, the terminal 100 determines the required reference transmission power (REFERENCE_P) in step 255.

The terminal 100 compares the required reference transmission power (REFERENCE_P) with the product of the maximum transmission power and the reference value (R) in step 260. It will be supposed that the required reference transmission power (REFERENCE_P) is smaller than the product of the maximum transmission power and the reference value (R). This means that transmission in a bundling mode is no longer needed.

Therefore, the terminal 100 transmits a packet containing the PHR through allotted transmission resources in step 265.

The base station 200 receiving the PHR sends a control message (RRC CONNECTION RECONFIGURATION REQUEST) to the terminal 100 in step 270. This control message refers to instructions for the terminal 100 to execute a non-bundling mode. Therefore, the terminal 100 receiving the control message switches a transmission mode to a non-bundling mode in step 275.

Now, an exemplary process of a bundling transmission at a terminal and a base station will be described respectively. First, a bundling transmission at a base station is described hereinafter.

Figure 3:
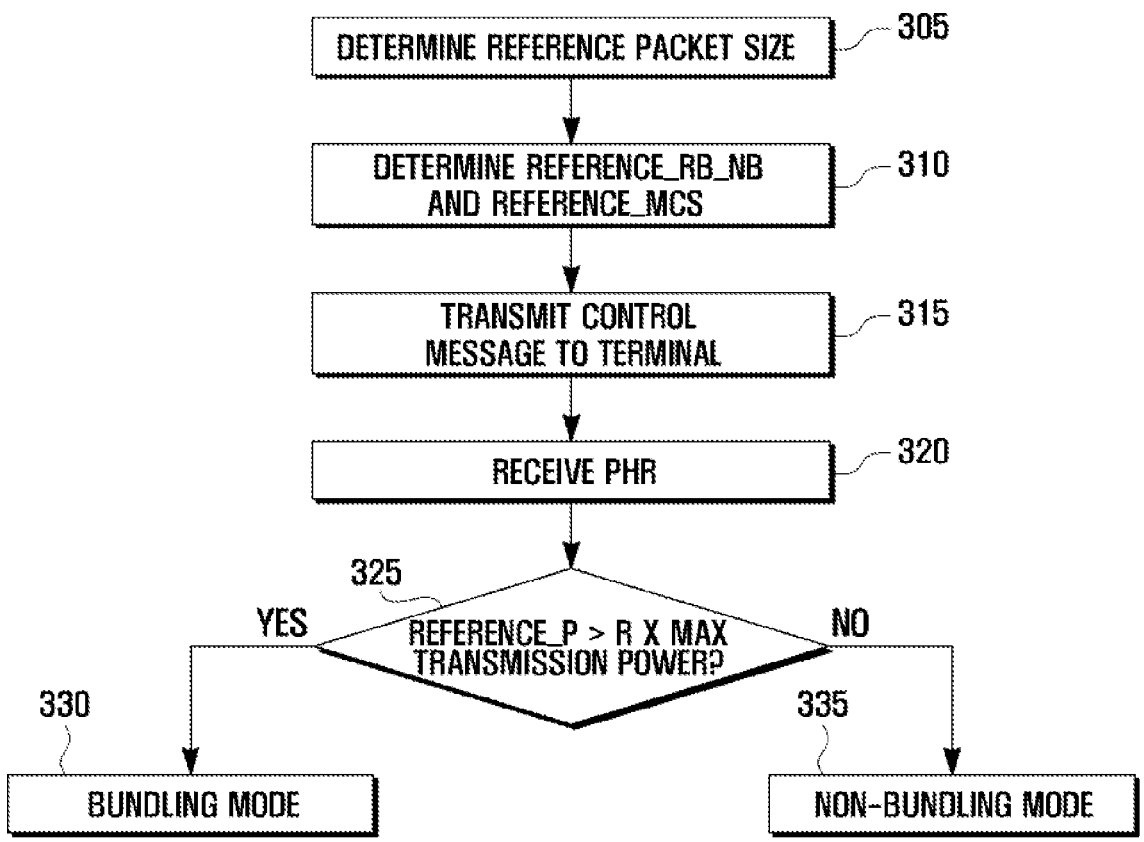
FIG. 3 is a flowchart which illustrates a process of a bundling transmission at a base station according to the first exemplary embodiment of the present invention.

FIG. 3 is a flowchart which illustrates a process of a bundling transmission at a base station according to the first exemplary embodiment of the present invention.

Referring to FIG. 3, the base station 200 determines the reference packet size of the terminal 100 in step 305.

As discussed above, the reference packet size refers to a specific size of a packet which the terminal 100 should transmit with a uniform transmission quality guaranteed under all circumstances. The reference packet size may be determined in view of services set up in the terminal 100. For example, if a certain terminal implements a VoIP service, the reference packet size is determined in consideration of the size of the most frequently occurring packet in a VoIP service.

After determining the reference packet size, the base station 200 further determines the reference amount of transmission resources (REFERENCE_RB_NB) and the reference level of MCS (REFERENCE_MCS) from the reference packet size in step 310. The packet size is generally related to a combination of the amount of transmission resources and the MCS level. Therefore, by using the above relation, the base station 200 may replace the reference packet size with the reference amount of transmission resources (REFERENCE_RB_NB) and the reference level of MCS (REFERENCE_MCS).

In step 315, the base station 200 transmits a control message to the terminal 100. This control message contains the reference amount of transmission resources (REFERENCE_RB_NB), the reference level of MCS (REFERENCE_MCS), and the reference value (R). As discussed above, the term 'R' is a parameter that prescribes a condition of creating the PHR, and is related to the number of continuous transmissions in a bundling mode. In an exemplary implementation, the term C may be found through experience by network operators. Thereafter, the base station 200 and the terminal 100 perform normal downlink and uplink communications.

When at any time the terminal 100 satisfies a creation condition of the PHR, the terminal 100 can transmit the PHR. The base station 200 receives the PHR from the terminal 100 in step 320.

The base station 200 compares the required reference transmission power (REFERENCE_P) of the mobile device 100 with the product of the maximum transmission power of the mobile device and the reference value (R) in step 325. The base station 200 can determine the sum of f(delta_i) and α×PL by substituting the PHR into the aforesaid Equation 1. Using the above sum, the reference amount of transmission resources (REFERENCE_RB_NB) and the reference level of MCS (REFERENCE_MCS), the base station 200 can determine the required reference transmission power (REFERENCE_P) of the terminal 100.

As a result of the comparison in step 325, if the required reference transmission power (REFERENCE_P) is greater than R times the maximum transmission power of the terminal 100, the base station 200 begins a procedure for operating the terminal 100 in a bundling mode in step 330. That is, the base station 200 sends a control message to the terminal 100 so that the terminal 100 can set a transmission mode to a bundling mode. On the other hand, if the required reference transmission power (REFERENCE_P) is less than R times the maximum transmission power of the terminal 100, the base station 200 begins a procedure for operating the terminal 100 in a non-bundling mode in step 335. Alternatively, the terminal 100 may simply continue executing a non-bundling mode in step 335.

Next, an exemplary method for bundling transmission at a terminal is described.

Figure 4:
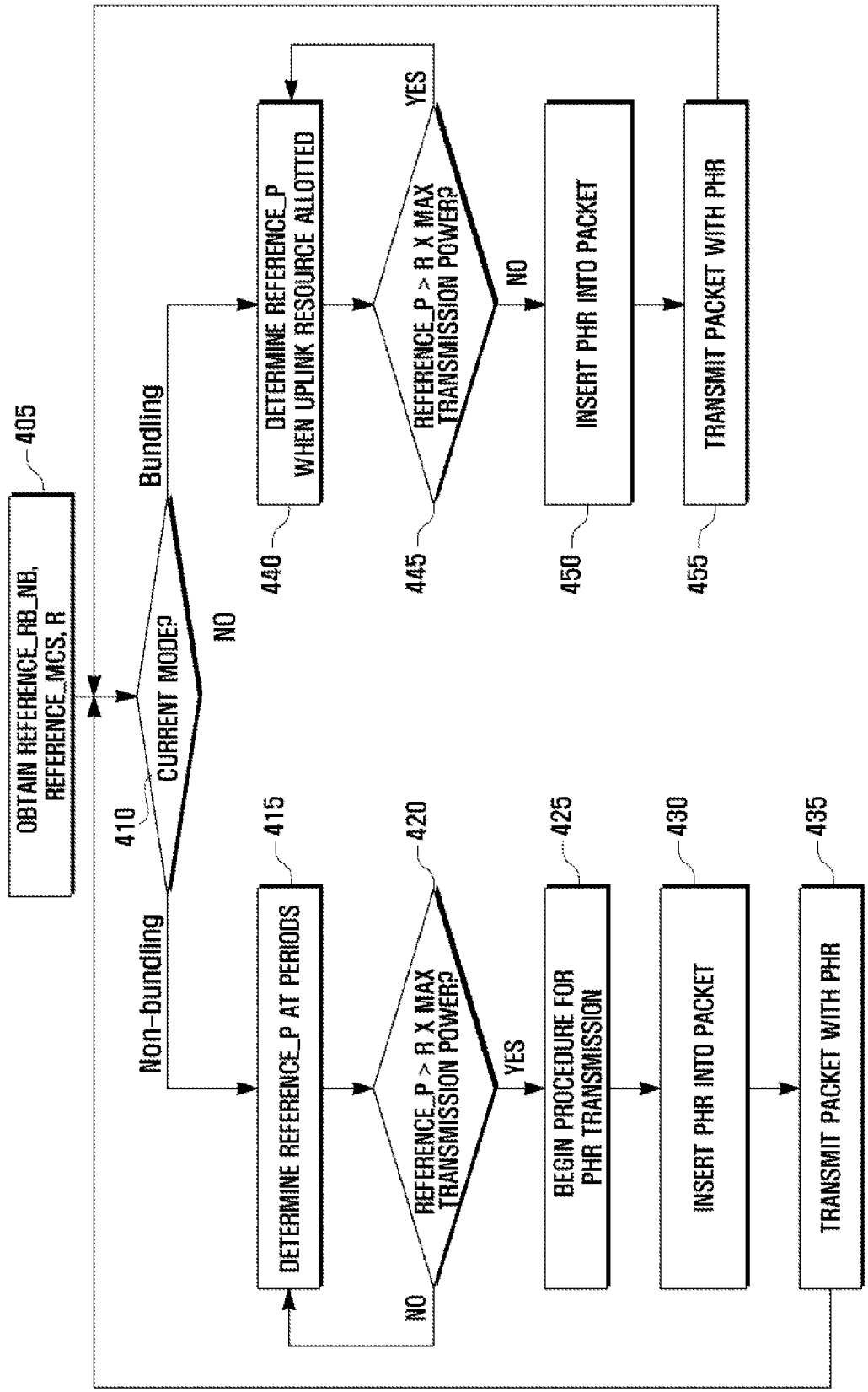
FIG. 4 is a flowchart which illustrates a process of a bundling transmission at a user terminal according to the first exemplary embodiment of the present invention.

FIG. 4 is a flowchart which illustrates a process of a bundling transmission at a user terminal in accordance with the first exemplary embodiment of the present invention.

Referring to FIG. 4, the terminal 100 receives a control message from the base station 200 and obtains the reference amount of transmission resources (REFERENCE_RB_NB), the reference level of MCS (REFERENCE_MCS), and the reference value (R) in step 405.

The terminal 100 determines whether the current transmission mode is a bundling mode or a non-bundling mode in step 410. Depending on the determination, the terminal 100 performs step 415 in case of a non-bundling mode or step 440 in case of a bundling mode.

In step 415, the terminal 100 determines the required reference transmission power (REFERENCE_P) at certain periods regardless of the reception of an uplink grant. As discussed above, the required reference transmission power (REFERENCE_P) is determined using the reference amount of transmission resources (REFERENCE_RB_NB) and the reference level of MCS (REFERENCE_MCS). In addition, the aforesaid period may be determined by network operators and terminal manufacturers.

In step 420, the terminal 100 compares the required reference transmission power (REFERENCE_P) with the product of the maximum transmission power and the reference value (R). After comparison, if it is determined that the required reference transmission power (REFERENCE_P) is greater than the product of the maximum transmission power and the reference value (R), the terminal 100 proceeds to step 425. However, if it is determined that the required reference transmission power (REFERENCE_P) is smaller than the product of the maximum transmission power and the reference value (R), the terminal 100 returns to step 415.

In step 425, a packet transmission with the reference size may fail to satisfy a given transmission quality. Therefore, the terminal 100 begins a procedure for transmitting the PHR in order to switch a non-bundling mode to a bundling mode.

A procedure for transmitting the PHR includes a step taken by the terminal 100 to be allotted transmission resources, that is, a step of reporting that there is data to be transmitted through given transmission resources. When receiving an uplink grant from the base station 200, the terminal 100 determines the PHR and inserts it into a packet to be transmitted through allotted transmission resources in step 430. The terminal 100 transmits the packet containing the PHR in step 435 and returns to step 410.

On the other hand, if it is determined in step 410 that the current transmission mode is a bundling mode, the terminal 100 waits until uplink transmission resources are allotted thereto. The terminal 100 determines the required reference transmission power (REFERENCE_P) when uplink resources are allotted in step 440.

In step 445, the terminal 100 compares the required reference transmission power (REFERENCE_P) with the product of the maximum transmission power and the reference value (R). After comparison, if it is determined that the required reference transmission power (REFERENCE_P) is greater than the product of the maximum transmission power and the reference value (R), the terminal 100 returns to step 440. However, if it is determined that the required reference transmission power (REFERENCE_P) is smaller than the product of the maximum transmission power and the reference value (R), the terminal 100 proceeds to step 450.

In step 450, a packet transmission with the reference size may satisfy a given transmission quality without using a bundling transmission. Therefore, the terminal 100 determines the PHR in order to switch a bundling mode to a non-bundling mode, and inserts the PHR into a packet to be transmitted through allotted transmission resources.

In step 455, the terminal 100 transmits a packet containing the PHR and returns to step 410.

If the terminal 100 receives a control message instructing to switch a transmission mode while performing the aforesaid steps 415 to 435 or 440 to 455, the terminal 100 switches a transmission mode and begins to take proper steps for a new transmission mode at the previous step 410.

Now, exemplary configurations of a terminal and a base station allowing bundling transmission will be described respectively. First, a configuration of a base station is described hereinafter.

Figure 5:
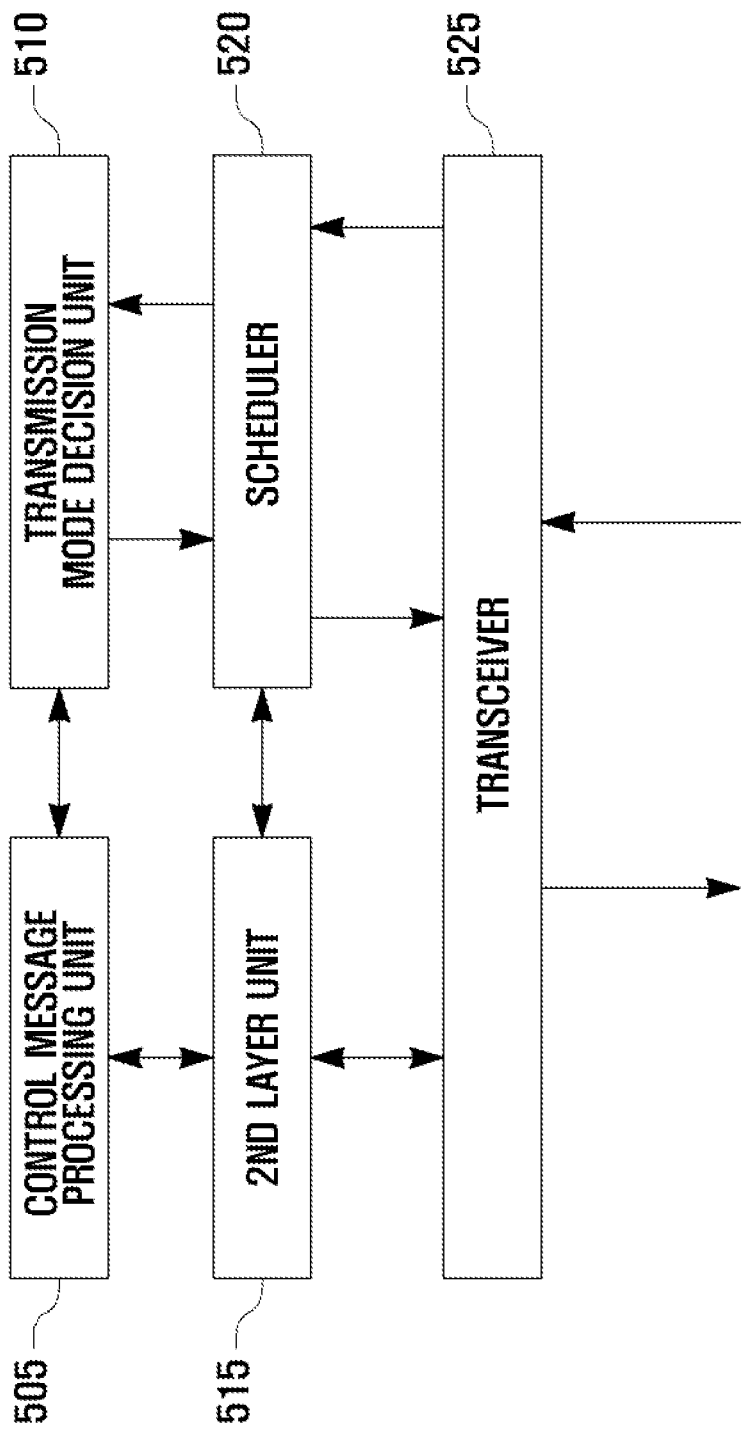
FIG. 5 is a block diagram which illustrates a base station apparatus for a bundling transmission according to the first exemplary embodiment of the present invention.

FIG. 5 is a block diagram which illustrates a base station apparatus for a bundling transmission according to the first exemplary embodiment of the present invention.

Referring to FIG. 5, the base station apparatus includes a control message processing unit 505, a transmission mode decision unit 510, a second layer unit 515, a scheduler 520, and a transceiver 525.

The control message processing unit 505 is configured to create and process a variety of control messages. The control message processing unit 505 transmits information necessary for determining a transmission mode (e.g., the reference amount of transmission resources (REFERENCE_RB_NB), the reference level of MCS (REFERENCE_MCS), and the reference value (R)) to the terminal 100 through the second layer unit 515 and the transceiver 525. When the transmission mode decision unit 510 requests switching of a transmission mode, the control message processing unit 505 creates a control message to instruct switching of a transmission mode and sends it to the second layer unit 515.

The transmission mode decision unit 510 determines whether there is a need to switch a transmission mode of the terminal 100 depending on information received from the scheduler 520. If switching of the transmission mode is needed, the transmission mode decision unit 510 notifies the control message processing unit 505.

The scheduler 520 allots transmission resources to the respective terminals 100 and determines the MCS level depending on the PHR or the BSR received from the transceiver 525. More particularly, the scheduler 520 determines the reference MCS level of each terminal 100. Additionally, the scheduler 520 delivers the reference MCS level to the control message processing unit 505 through the transmission mode decision unit 510.

The second layer unit 515 refers generically to a Radio Link Control (RLC) unit, a Media Access Control (MAC) unit, etc. The second layer unit 515 allows upper layer data such as a third layer control message to be framed to suitable sizes. Additionally, the second layer unit 515 applies an automatic retransmission operation and offers a multiplexing function.

The transceiver 525 transmits a MAC Packet Data Unit (PDU), received from the second layer unit 515, to a wireless channel. Also, the transceiver 525 transmits a downlink grant or an uplink grant through a given wireless channel and processes signals received through the wireless channel. If the received signal includes upper layer data, it is delivered to the second layer unit 515. If the received signal is the PHR or BSR, it is delivered to the scheduler 520.

Next, an exemplary configuration of a terminal is described hereinafter.

Figure 6:
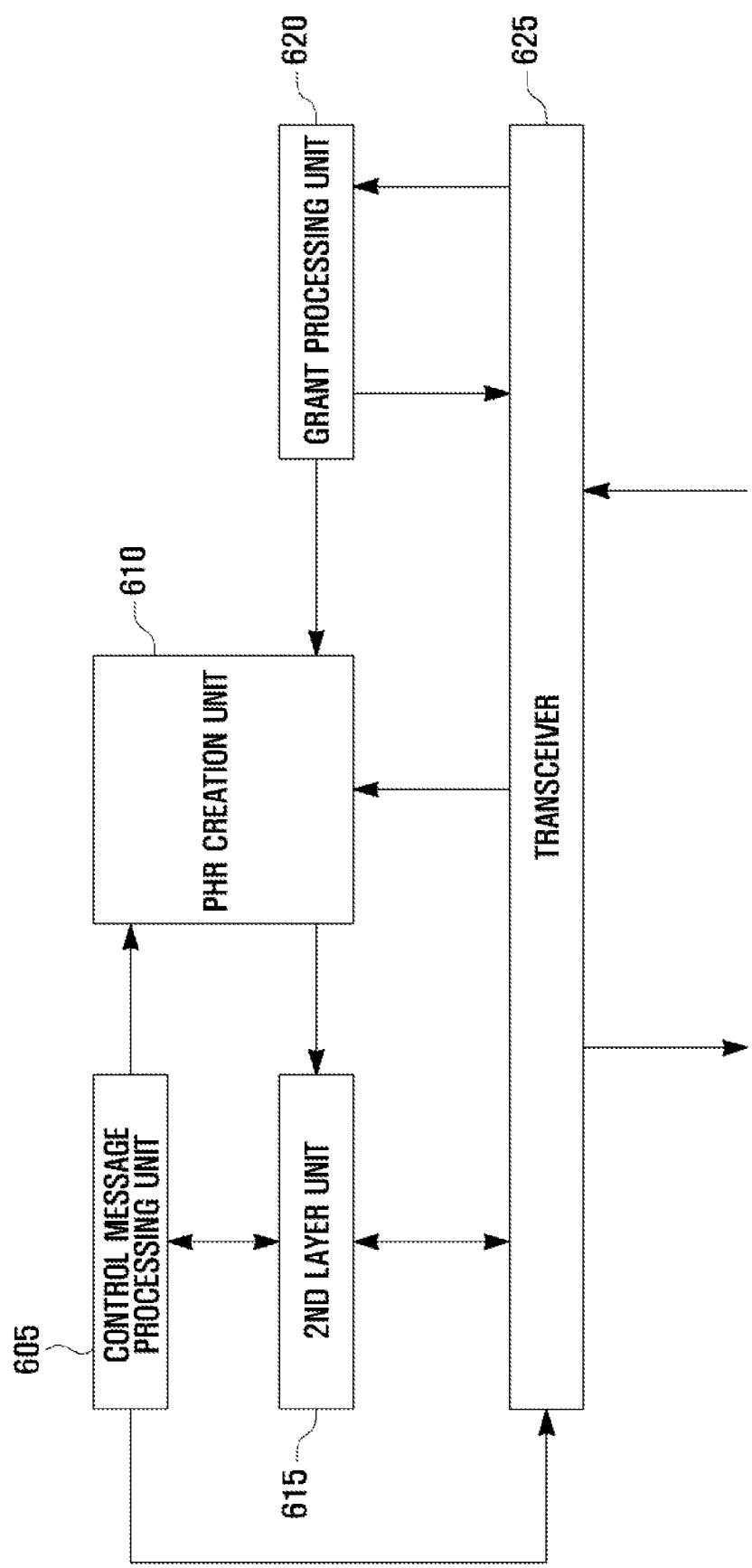
FIG. 6 is a block diagram which illustrates a user terminal apparatus for a bundling transmission according to the first exemplary embodiment of the present invention.

FIG. 6 is a block diagram which illustrates a user terminal apparatus for a bundling transmission according to the first exemplary embodiment of the present invention.

Referring to FIG. 6, the terminal apparatus includes a control message processing unit 605, a PHR creation unit 610, a second layer unit 615, a grant processing unit 620, and a transceiver 625.

The control message processing unit 605 is configured to receive and process a variety of control messages. If the received control message contains the reference amount of transmission resources (REFERENCE_RB_NB), the reference level of MCS (REFERENCE_MCS) and the reference value (R), the control message processing unit 605 delivers them to the PHR creation unit 610. Also, if the received control message contains instructions to switch a transmission mode, the control message processing unit 605 controls the transceiver 625 in order to switch a transmission Mode to an instructed mode.

The PHR creation unit 610 determines the required reference transmission power (REFERENCE_P) by using the reference amount of transmission resources (REFERENCE_RB_NB) and the reference level of MCS (REFERENCE_MCS). The PHR creation unit 610 creates the PHR from the required reference transmission power (REFERENCE_P). For example, the PHR creation unit 610 creates the PHR when the required reference transmission power (REFERENCE_P) is smaller than R times the maximum transmission power in a bundling mode. Also, the PHR creation unit 610 creates the PHR when the required reference transmission power (REFERENCE_P) is greater than R times the maximum transmission power in a non-bundling mode. The PHR creation unit 610 delivers the PHR to the second layer unit 615.

The second layer unit 615 refers generically to an RLC unit, an MAC unit, etc. The second layer unit 615 allows upper layer data such as a third layer control message to be framed to suitable sizes. Also, the second layer unit 615 applies an automatic retransmission operation and offers a multiplexing function. In addition, the second layer unit 615 restores data, received from the transceiver 625, to original upper layer data and delivers it to a suitable upper layer. Furthermore, the second layer unit 615 multiplexes some control messages such as the PHR and delivers them to the transceiver 625.

The grant processing unit 620 analyzes a grant received through a wireless channel and finds allotted transmission resources and an MCS level. Using the granted resources, the grant processing unit 620 controls the transceiver 625 to transmit and receive data.

The transceiver 625 transmits MAC PDU, received from the second layer unit 615, to a wireless channel. Also, the transceiver 625 receives a downlink grant or an uplink grant through a wireless channel and delivers it to the grant processing unit 620. More particularly, the transceiver 625 transmits and receives data in one of a bundling mode and a non-bundling mode under the control of the control message processing unit 605.

Second Exemplary Embodiment

Now, a second exemplary method for a bundling transmission will be described. Discussion in this exemplary embodiment is focused on operation of a terminal which receives an uplink grant in a bundling mode.

As mentioned above, the bundling transmission is a technique that allows the terminal to perform an n-time repeated delivery of the same data through transmission resources allocated thereto.

In the present LTE standards, the above variable 'n' is fixed to four, and four Hybrid Automatic Retransmit reQuest (HARQ) processes are used in bundling transmission. That is, an HARQ process happens four tunes in each individual bundling transmission.

When receiving an uplink grant at the x-th sub-frame, the terminal 100 performs an uplink transmission four times, that is from the x-th sub-frame through the (x+4)-th sub-frame.

For example, if the terminal receives an uplink grant at the x-th sub-frame and then receives another uplink grant before the (x+4)-th sub-frame, transmission resources (i.e., sub-frames) for two bundling transmissions may conflict with each other.

As discussed above, in a case in which two transmission resources will conflict with each other, the terminal 100 may perform a bundling transmission for only one of the two transmission resources at conflicting parts, and also, may perform a bundling transmission for each transmission resource at non-conflicting parts. However, this is not desirable since there may occur a case where the number of HARQ processes simultaneously used by the terminal 100 exceeds four.

In order to prevent such simultaneous bundling transmission when conflicting transmissions occurs, the terminal 100 determines an identifier of the HARQ process which causes conflicting transmission, and then discards data stored in the HARQ process. First, an exemplary method for a bundling transmission will be described hereinafter.

Figure 7:
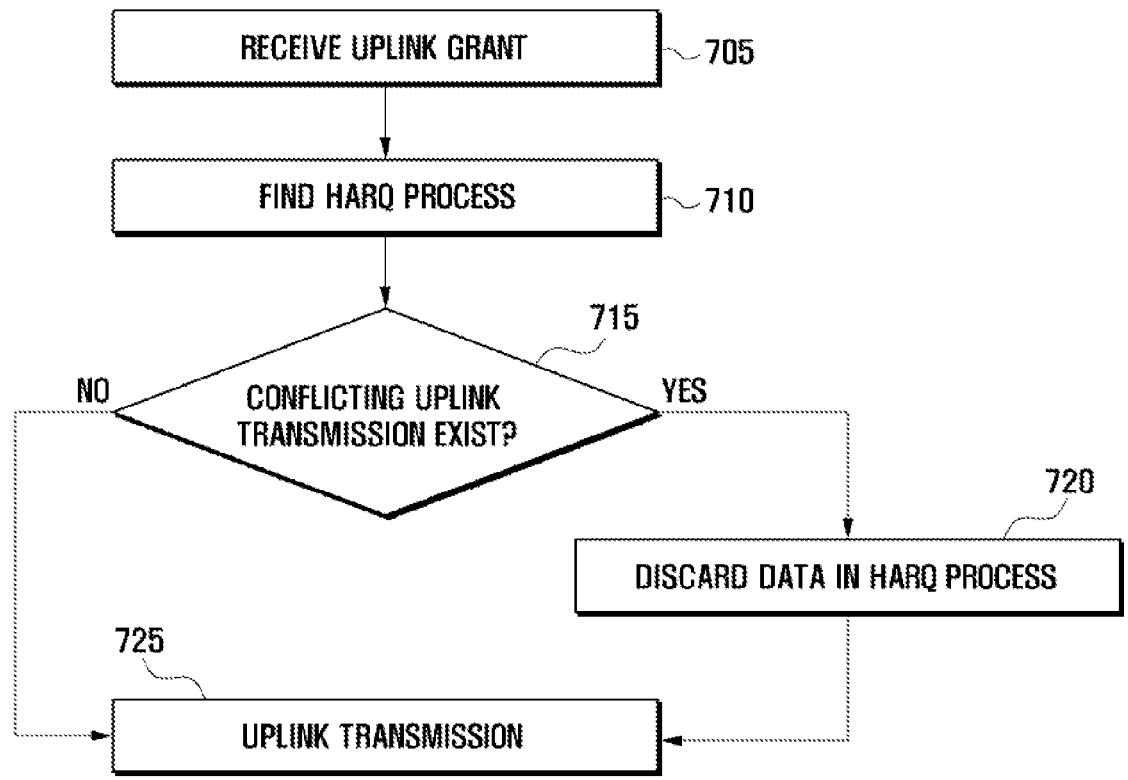
FIG. 7 is a flowchart which illustrates a method for a bundling transmission according to a second exemplary embodiment of the present invention.

FIG. 7 is a flowchart which illustrates a method for a bundling transmission according to a second exemplary embodiment of the present invention.

Referring to FIG. 7, the terminal 100 receives an uplink grant in a bundling mode in step 705, and finds the HARQ process corresponding to the received uplink grant in step 710. That is, the terminal 100 ascertains a specific HARQ process, for data to be transmitted through uplink transmission resources, which is allotted according to the uplink grant.

An identifier of the HARQ process is derived from a frame number and a sub-frame number at the time when receiving an uplink grant. For example, the frame number at the receiving time of the uplink grant may be multiplied by ten and then added to the sub-frame number. Thereafter, by performing a modulo operation of the above resultant number and the number of HARQ processes, an identifier of a specific HARQ process for uplink transmission to be caused by the received uplink grant may be obtained.

The terminal 100 determines whether the first uplink transmission to be executed by the received uplink grant conflicts with any uplink transmission of another HARQ process being currently executed in step 715. If it is determined that there is a conflict, the terminal 100 proceeds to step 720. However, if it is determined that there is no conflict, the terminal 100 proceeds to step 725.

More specifically, while the above step 715 is in progress and uplink transmission with HARQ ACKnowledgement (ACK) not received is performed, the terminal 100 determines whether there is an uplink transmission which at least partially conflicts with the first uplink transmission to be executed by an uplink grant received in the above step 705.

The aforesaid step 715 may be realized as follows. If an uplink grant is received at the x-th sub-frame, uplink transmission by the received uplink grant may be performed from the (x+4)-th sub-frame to the (x+7)-th sub-frame. Therefore, the terminal 100 determines whether there is any HARQ process to perform uplink transmission between the (x+4)-th and the (x+7)-th sub-frames.

In step 720, the terminal 100 ascertains an identifier of a specific HARQ process to perform conflicting transmission and discards data stored in the HARQ process before uplink transmission.

In step 725, the terminal 100 performs uplink transmission through uplink transmission resources earlier instructed in the aforesaid step 705.

On the other hand, if the scheduler of the base station 200 normally operates, the scheduler may properly allot an uplink grant not to cause conflicting uplink transmission. Nevertheless, if a conflicting uplink transmission occurs, one of two uplink transmissions is caused by an improper grant. For example, due to a failure in detection of remaining errors by a Cyclic Redundancy Check (CRC), the terminal 100 may receive an improper grant which is not allotted by the base station 200. When transmission is performed by such an improper grant, a resultant improper uplink transmission may give rise to interference with another uplink transmission and thus may cause a failure in transmission. Therefore, it is desirable that an improper uplink transmission should not be performed.

Additionally, in a case where two uplink transmissions conflict with each other, it is difficult to know which uplink transmission is caused by an improper grant. Therefore, when a conflicting uplink transmission happens, it may be desirable that two uplink transmissions should both be given up.

Next, an exemplary method for a bundling transmission will be described.

Figure 8:
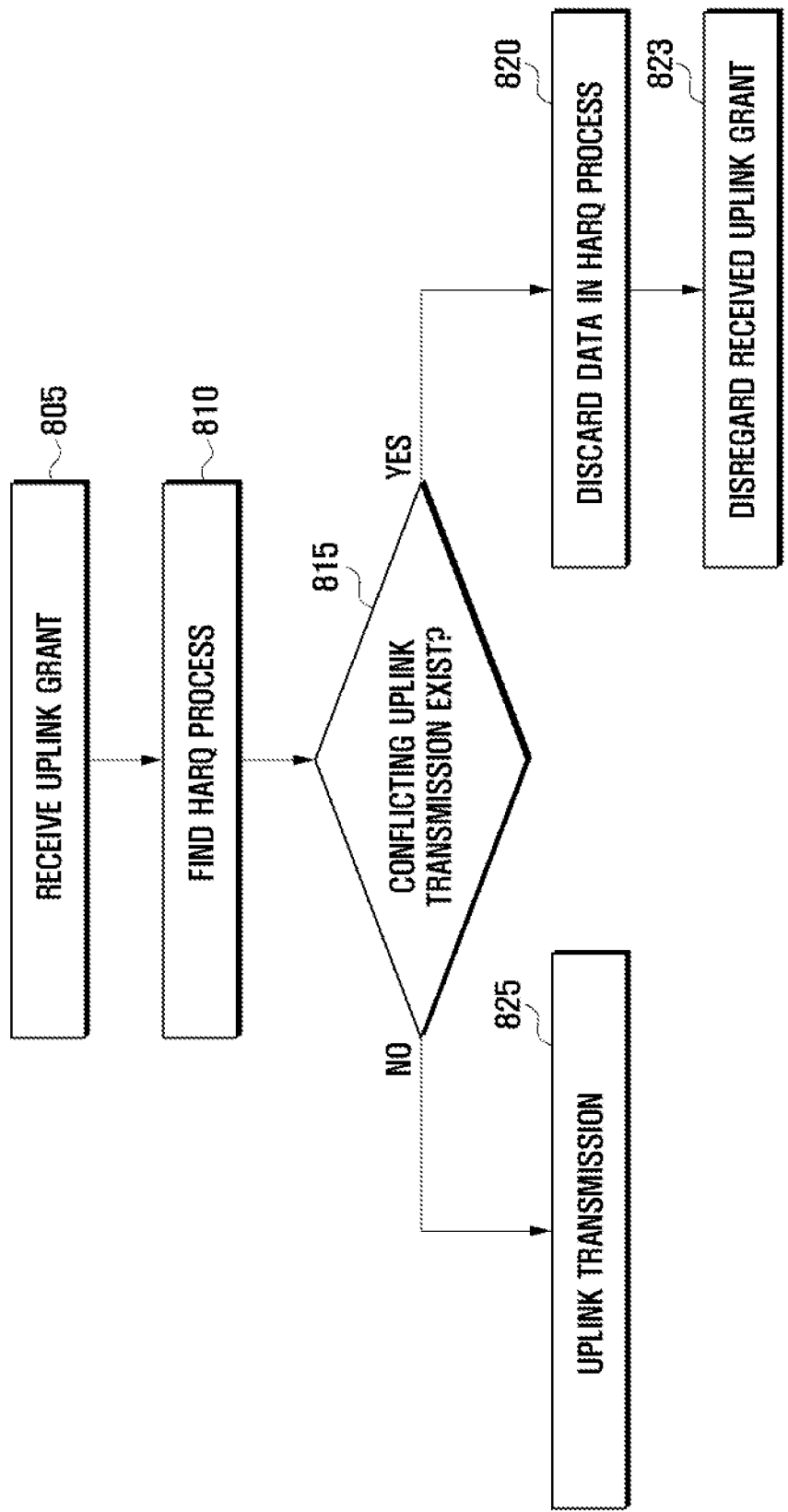
FIG. 8 is a flowchart which illustrates a method for a bundling transmission according to the second exemplary embodiment of the present invention.

FIG. 8 is a flowchart which illustrates a method for a bundling transmission according to a second exemplary embodiment of the present invention.

Referring to FIG. 8, a terminal 100 receives an uplink grant in a bundling mode in step 805, and finds the HARQ process related to the received uplink grant in step 810. That is, the terminal 100 ascertains a specific HARQ process, for data to be transmitted through uplink transmission resources, which is allotted according to the uplink grant.

In step 815, the terminal 100 determines whether the first uplink transmission to be executed by the received uplink grant conflicts with any uplink transmission of another HARQ process being currently executed. If it is determined that there is a conflict, the terminal 100 proceeds to step 820. However, if it is determined that there is no conflict, the terminal 100 proceeds to step 825.

In step 820, the terminal 100 ascertains an identifier of a specific HARQ process to perform conflicting transmission and discards data stored in the HARQ process before uplink transmission. The terminal 100 disregards the uplink grant received in the aforesaid step 805 in step 823.

On the other hand, in step 825, the terminal 100 performs uplink transmission as earlier instructed in the aforesaid step 805.

Third Exemplary Embodiment,

Uplink retransmission may be classified into adaptive retransmission and non-adaptive retransmission.

Adaptive retransmission is the performance of retransmission through transmission resources instructed by separate uplink grant, whereas non-adaptive retransmission is the performance of retransmission through normally used transmission resources.

After uplink transmission, the terminal 100 performs non-adaptive retransmission if receiving HARQ Not ACKnowledgement (NACK) but failing to receive a separate uplink grant which instructs adaptive retransmission.

While non-adaptive retransmission is performed in a bundling mode, there may be unfavorable circumstances where a part or all of non-adaptive retransmission conflicts with other bundling transmission. For example, in a case where uplink transmission is performed through predefined transmission resources, there is a possibility that the first transmission using the predefined transmission resources may conflict with non-adaptive retransmission performed through uplink transmission resources caused by an uplink grant. In other words, adaptive retransmission and non-adaptive retransmission may conflict with each other in a bundling mode.

Here, a predefined transmission resource refers to a transmission resource which is allotted in advance at fixed periods to the terminal 100 for services, such as VoIP, in which given sized packets are periodically created. A predefined transmission resource may also be referred to as semi-persistent resource.

Like normal transmission resources, predefined transmission resources are allotted through an uplink grant. However, in comparison with an uplink grant used to allot normal transmission resources, stronger error detection codes are applied to an uplink grant used to allot predefined transmission resources. Therefore, in comparison with an uplink grant used for normal transmission resources, an uplink grant used for predefined transmission resources may have a lower possibility of being improper.

Hence, in a case where uplink transmission induced by an uplink grant conflicts with non-adaptive retransmission, it is desirable that uplink transmission using predefined transmission resources should be performed but non-adaptive uplink retransmission should be canceled. An exemplary method for a bundling transmission will be described hereinafter.

Figure 9:
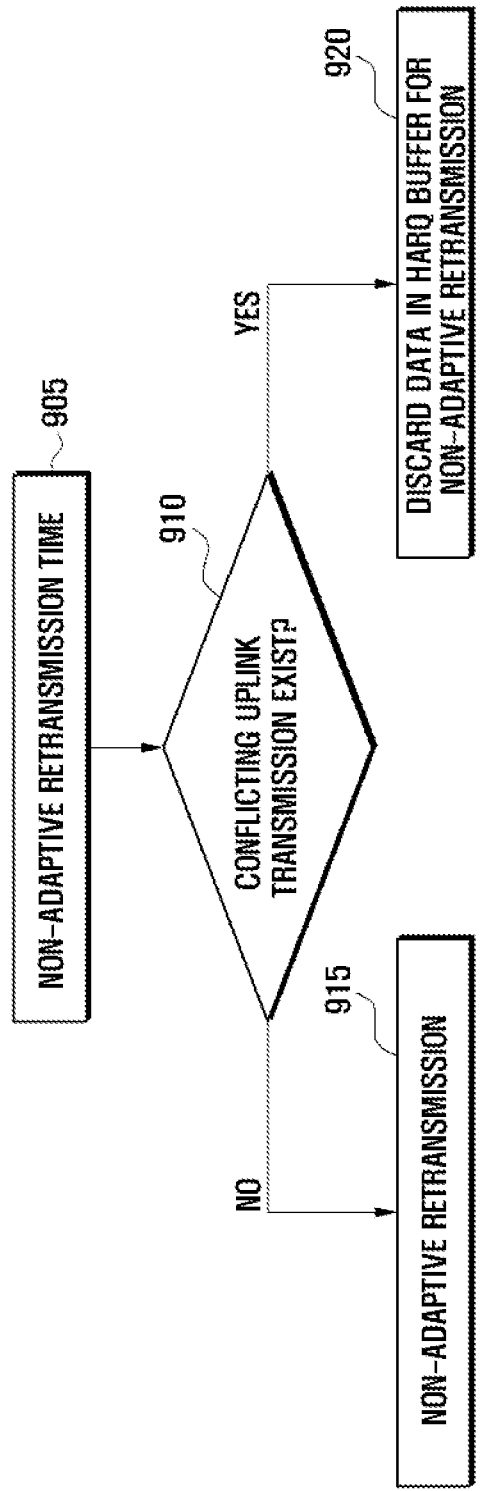
FIG. 9 is a flowchart which illustrates a method for a bundling transmission according to a third exemplary embodiment of the present invention.

FIG. 9 is a flowchart which illustrates a method for a bundling transmission according to a third exemplary embodiment of the present invention.

Referring to FIG. 9, a terminal 100 ascertains that the execution time of non-adaptive retransmission in a certain HARQ process arrives in step 905.

Here, arriving at the execution time of non-adaptive retransmission in the HARQ process means that data is stored in the HARQ process, HARQ NACK is received through feedback of the previous HARQ, and the transmission time of the HARQ process arrives.

In step 910, the terminal 100 determines whether any uplink transmission by predefined transmission resources conflicts with non-adaptive retransmission. As discussed above, an uplink transmission conflicting with non-adaptive retransmission may be an uplink transmission by predefined transmission resources through an uplink grant.

If it is determined that there is no uplink transmission which conflicts with non-adaptive retransmission, the terminal 100 performs non-adaptive retransmission in step 915.

However, if it is determined that there is an uplink transmission conflicting with non-adaptive retransmission, the terminal 100 discards data stored in an HARQ buffer where non-adaptive retransmission is scheduled, in order to cancel the non-adaptive retransmission before it is performed in step 920.

Fourth Exemplary Embodiment

As discussed above, four HARQ processes are used in a bundling mode. In addition, the HARQ Round Trip Time (RTT) is sixteen sub-frames. Normally an identifier of the HARQ process in the synchronous HARQ type is induced from information on the time when uplink grant is received. In normal HARQ operation, the number of HARQ processes is eight, and the HARQ RTT is also eight sub-frames. That is, particular HARQ process is repeated at every eight sub-frame. This may be expressed as the following Equation 2.

$$\text{HARQ process identifier} = [\text{frame number} * 10 + \text{sub-frame number}] \text{modulo}[\text{the number of HARQ processes}] \qquad \text{Eq. (2)}$$

If Equation 2 is applied to a bundling transmission, continuous uplink transmission becomes impossible. Hereinafter, a term [frame number*10+sub-frame number] will be represented by 'n' for convenience of explanation.

For example, if an uplink grant is received at the time when 'n' is 100, an identifier of HARQ process is zero. Since uplink transmission is generally performed after the fourth sub-frame from a sub-frame receiving an uplink grant, uplink transmission in the above example is performed from the time when 'n' is 104 to the time when 'n' is 107. Under this circumstance, a new uplink transmission using some HARQ process other than HARQ process 0 needs an uplink grant to be received at the time when 'n' is 104. However, an identifier of HARQ process at the time when 'n' is 104 is also 0, so that transmission through some HARQ process other than HARQ process 0 may be impossible at the time when 'n' is 108. This means that uplink transmission through another HARQ process is allowed only at the time when some integer other than 0 is drawn from an algebraic expression 'n MOD [4]'. Also, uplink transmission through another HARQ process would be undesirable in view of flexibility of scheduling.

In order to allow continuous transmission though different HARQ processes, a way of determining an identifier of HARQ process by using HARQ RTT rather than the number of HARQ processes may be alternatively considered. That is, an identifier of a HARQ process can be determined through the following Equation 3.

$$\text{HARQ process identifier} = [\text{frame number} * 10 + \text{sub-frame number}] \text{modulo}[\text{HARQ RTT}] \qquad \text{Eq. (3)}$$

This case may, however, have a drawback in that the number of HARQ processes may increase according to the number of HARQ RTT. That is, the number of HARQ processes in the terminal is not four but sixteen.

In order to address the above problem, the base station performs uplink scheduling for the terminal so that the number of HARQ processes used simultaneously may not exceed four. That is, the base station does not instruct a new uplink transmission to the terminal which has already used four HARQ processes. Additionally, the terminal which has already used four HARQ processes may disregard uplink grant instructing a new uplink transmission. This is a case of a fourth exemplary embodiment of this invention.

Figure 10:
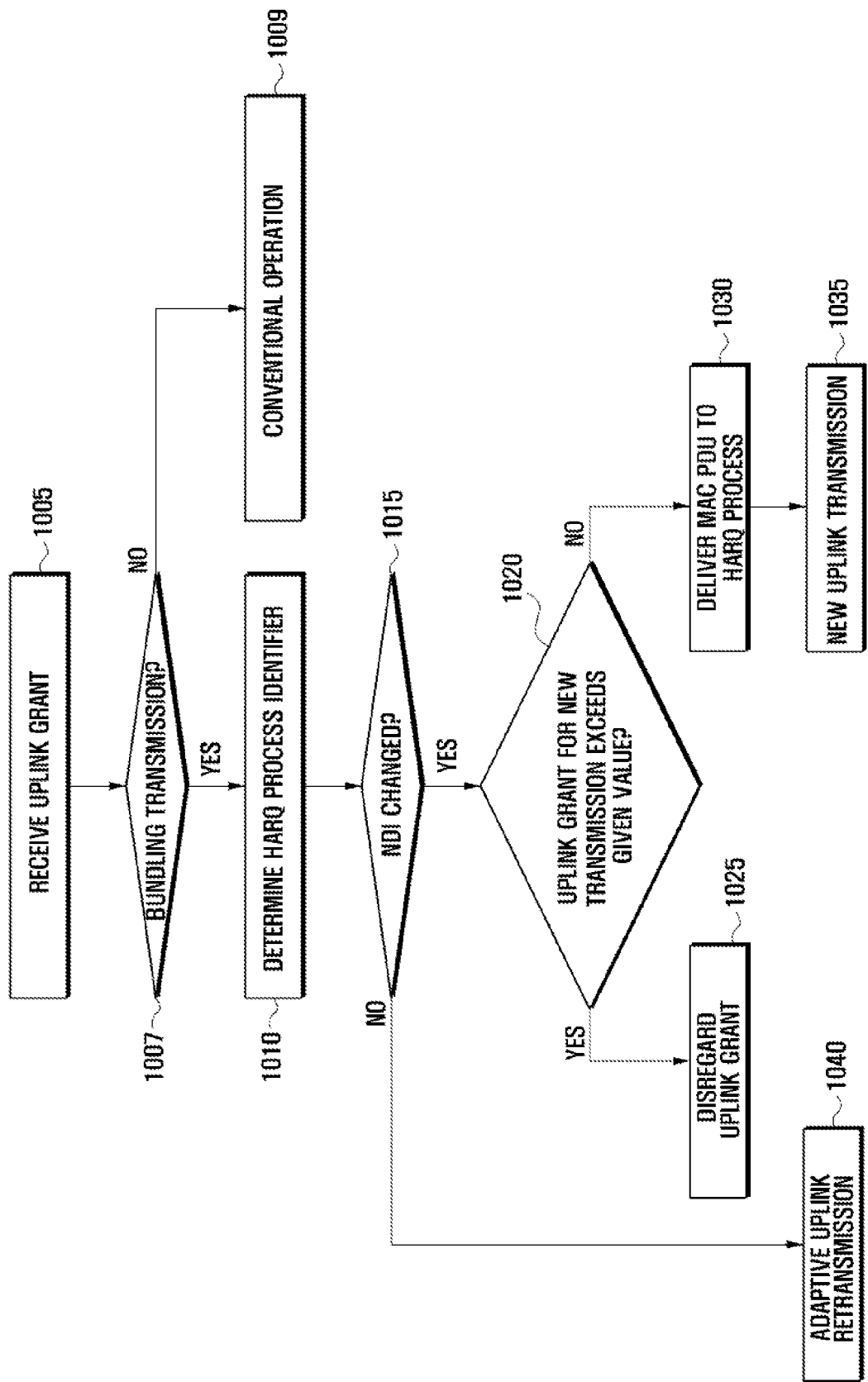
FIG. 10 is a flowchart which illustrates a method for a bundling transmission according to a fourth exemplary embodiment of the present invention.

FIG. 10 is a flowchart which illustrates a method for a bundling transmission according to a fourth exemplary embodiment of the present invention.

Referring to FIG. 10, the terminal receives an uplink grant in step 1005, and determines whether a bundling transmission is being performed in step 1007.

If it is determined that a bundling transmission is not performed, the terminal operates based on conventional techniques in step 1009. On the other hand, if it is determined that a bundling transmission is being performed, the terminal determines an identifier of HARQ process corresponding to uplink grant through the aforesaid Equation 3 in step 1010. Since HARQ RTT in a bundling mode is fixed at 16, the above Equation 3 may be replaced with the following Equation 4.

$$\text{HARQ process identifier} = [\text{frame number} * 10 + \text{subframe number}] \bmod 16 \qquad \text{Eq. (4)}$$

In Equation 4, a given integer may be alternatively used instead of the aforesaid HARQ RTT. This alternative integer may be predetermined or signaled.

After determining a HARQ identifier, the terminal determines whether a New Data Indicator (NDI) of an uplink grant is changed in comparison with the current NDI of corresponding HARQ process in step 1015. An NDI is used to distinguish a new transmission from retransmission. If an NDI contained in an uplink grant for a certain HARQ process is different from the preceding NDI of the HARQ process, the terminal regards the uplink grant as instructing a new transmission. If it is determined in the above step 1015 that an NDI is the same as the preceding NDI (i.e., if there is no NDI change), the terminal performs adaptive retransmission in step 1040.

However, if it is determined in the above step 1015 that an NDI is different from the preceding NDI (i.e., if there is an NDI change), the terminal further determines whether to perform a new uplink transmission according to the uplink grant in step 1020. The base station performs scheduling so that the number of HARQ processes used simultaneously may not exceed a given value, for example, four. If the number of HARQ processes used by an uplink grant instructing a new transmission exceeds a given value, the terminal disregards the uplink grant in step 1025.

In a case in which the number of HARQ processes used by an uplink grant instructing a new transmission exceeds four which is a given value, the number of HARQ processes in use is four, and also, a specific HARQ process in which a new transmission begins by uplink grant is not one of four HARQ processes in use.

Unless the number of HARQ processes used by a new uplink grant exceeds a given value, the terminal composes a new MAC PDU and delivers it to a specific HARQ process determined in the above step 1010 in step 1030. The terminal performs a new uplink transmission through the HARQ process in step 1035.

That is, if the number of HARQ processes in use is smaller than a given value, or if the number is equal to a given value but the uplink grant is a HARQ process in use, the terminal performs step 1030. Here, a given value is not limited to four and may be any other value alternatively predetermined or signaled from the base station.

Fifth Exemplary Embodiment

In this exemplary embodiment, two bundling transmissions conflict with each other. If one bundling transmission is induced by a predefined uplink grant, that bundling transmission is performed and the other bundling transmission by normal uplink grant is abandoned. As discussed above, in comparison with an uplink grant allotting normal transmission resources, an uplink grant allotting predefined transmission resources may have a lower possibility of being incorrect. It is therefore desirable that an uplink transmission by a predefined grant has priority.

Figure 11:
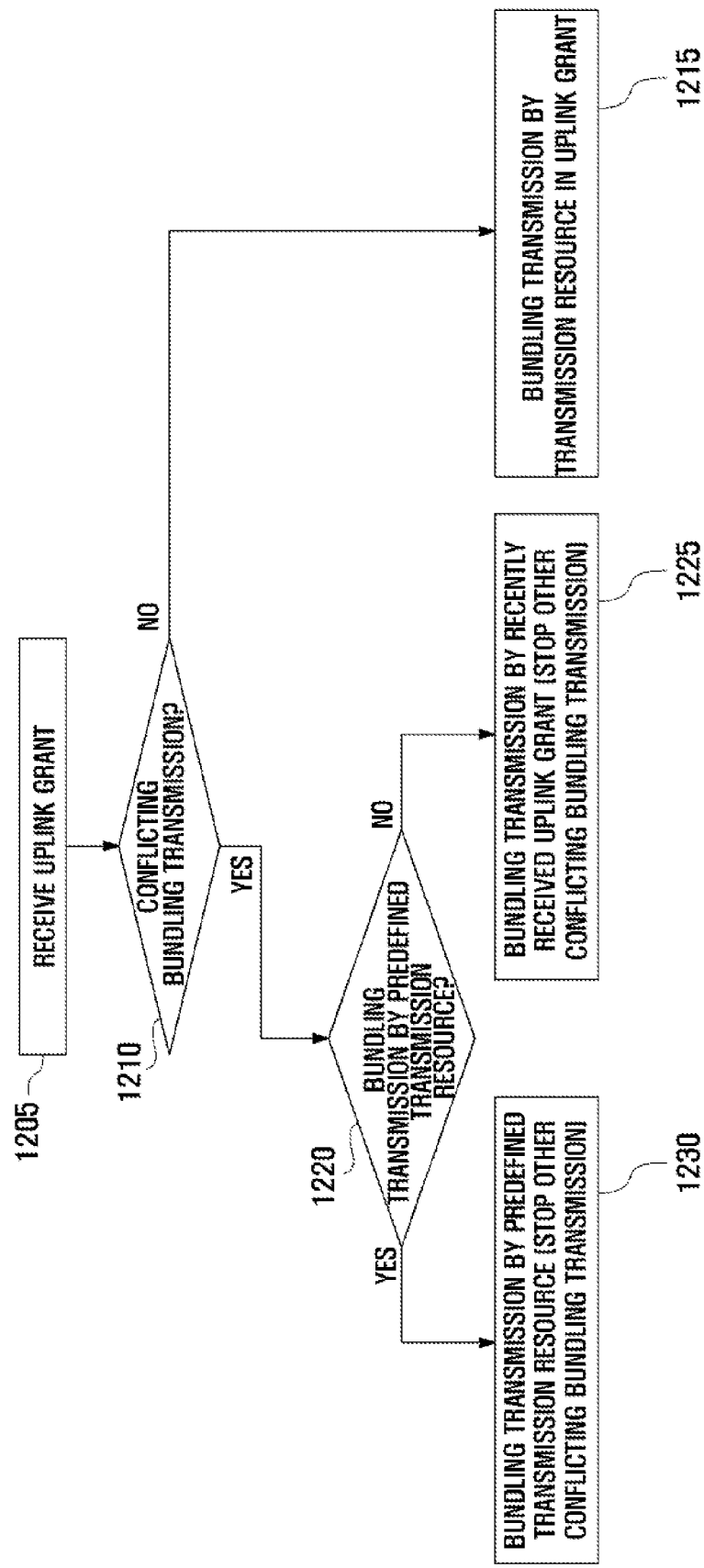
FIG. 11 is a flowchart which illustrates a method for a bundling transmission according to a fifth exemplary embodiment of the present invention.

FIG. 11 is a flowchart which illustrates a method for a bundling transmission according to a fifth exemplary embodiment of the present invention.

Referring to FIG. 11, the terminal, which is in a bundling mode, receives an uplink grant in step 1205.

In step 1210, the terminal determines whether there are conflicting bundling transmissions in transmission resources by the received uplink grant.

If it is determined that there is no conflicting bundling transmission, the terminal performs uplink bundling transmission according to transmission resource information in uplink grant in step 1215.

On the other hand, if it is determined that there are conflicting bundling transmissions, the terminal further determines whether there is bundling transmission by predefined transmission resources in the conflicting bundling transmissions in step 1220.

If there is bundling transmission by predefined transmission resources, the terminal proceeds to step 1230. If bundling transmission is induced by normal grant rather than by predefined transmission resources, the terminal proceeds to step 1225.

As discussed in the third exemplary embodiment, a predefined transmission resource refers to a transmission resource which is allotted in advance at fixed periods to the terminal for services, such as VoIP, in which given sized packets are periodically created. A predefined transmission resource may also be referred to as semi-persistent resource.

In case of normal bundling transmission, the terminal performs bundling transmission by the most recently received uplink grant in conflicting bundling transmissions and stops the other conflicting bundling transmissions in step 1225. This is the same as data stored in an HARQ buffer where conflicting bundling transmission is performed or to be performed is discarded.

On the other hand, if there is bundling transmission by predefined transmission resources, the terminal performs bundling transmission by predefined transmission resources in conflicting bundling transmissions and stops the other conflicting bundling transmissions in step 1230. This is substantially the same as data stored in an HARQ buffer where conflicting bundling transmission is performed or to be performed is discarded.

Like normal transmission resources, predefined transmission resources are allotted through an uplink grant. However, in comparison with an uplink grant used to allot normal transmission resources, much stronger error detection codes are applied to an uplink grant used to allot predefined transmission resources. Hence, in comparison with an uplink grant used for normal transmission resources, an uplink grant used for predefined transmission resources may have a lower possibility of being incorrect. Therefore, in this exemplary embodiment, bundling transmission by predefined transmission resources has priority.

Sixth Exemplary Embodiment

When a terminal in a bundling mode receives an uplink grant, bundling transmission induced by the received uplink grant may conflict with two or more bundling transmissions which are already being performed. In this case, the received uplink grant may be due to a detection failure in remaining errors of an improper grant. Therefore, the received uplink grant is discarded. As discussed above, if the scheduler of the base station normally operates, the scheduler may properly allot an uplink grant not to cause conflicting uplink transmission. Nevertheless, if a conflicting uplink transmission occurs, one of two uplink transmissions is caused by an improper grant. In normal cases, it is difficult to know which uplink transmission between an already progressing uplink transmission and a newly progressing uplink transmission is caused by an improper grant.

An improper grant is caused when the terminal receives a grant which is not allotted by the base station due to a failure in detection of remaining errors by CRC. Here, a detection failure of CRC remaining errors is a case in which a result of CRC determination for a received uplink grant is successful though it fails when an uplink grant allotted to another terminal is received.

If bundling transmission to be induced by an uplink grant conflicts with two or more bundling transmissions which are being already performed, that uplink grant may be an incorrect grant since the base station cannot allot such grant. Therefore, in this exemplary embodiment, such an incorrect grant is disregarded.

Figure 12:
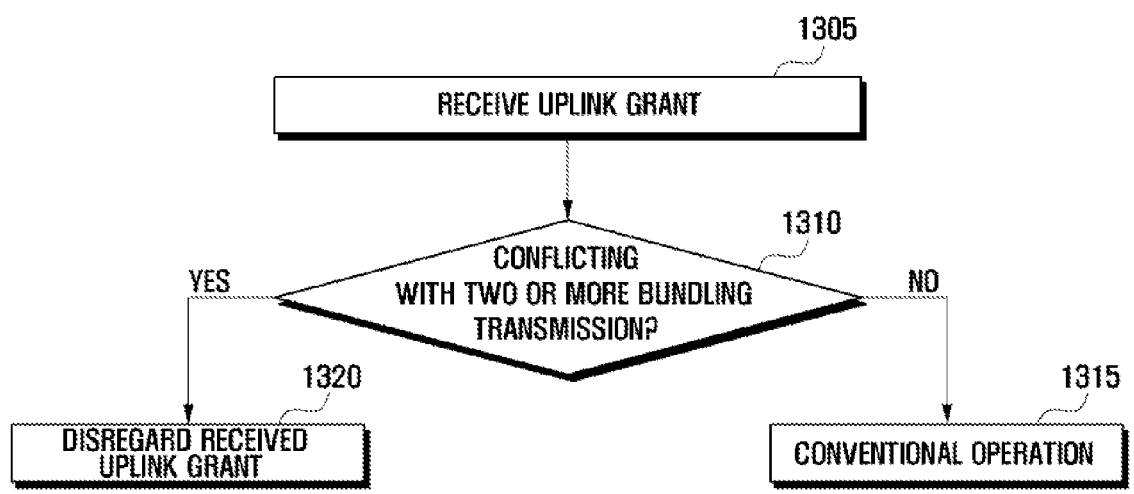
FIG. 12 is a flowchart which illustrates a method for a bundling transmission according the sixth exemplary embodiment of the present invention.

FIG. 12 is a flowchart which illustrates a method for a bundling transmission according to a sixth exemplary embodiment of the present invention.

Referring to FIG. 12, a terminal, which is in a bundling mode, receives an uplink grant in step 1305.

In step 1310, the terminal determines whether uplink bundling transmission executed by the received uplink grant conflicts with two or more uplink bundling transmissions in progress.

If it is determined in step 1310 that uplink bundling does not conflict with two or more uplink bundling transmissions, the terminal operates based on conventional techniques in step 1315. That is, the terminal performs bundling transmission according to the received uplink grant.

If it is determined in step 1310 that uplink bundling does conflict with two or more uplink bundling transmissions, the received grant may be an incorrect grant. Therefore, the terminal disregards the received grant in step 1320. That is, the terminal does not perform uplink bundling transmission based on information instructed by the received grant.

Accordingly, an exemplary method for a bundling transmission may supplement errors in CRC determination results by disregarding an uplink grant that is likely incorrect.

FIG. 13 is a block diagram which illustrates an apparatus for a bundling transmission of a user terminal according to an exemplary embodiment of the present invention.

Referring to FIG. 13, the terminal includes a control message processing unit 1105, a second layer unit 1115, a retransmission unit 1117, a transmission control unit 1110, a grant processing unit 1120, and a transceiver 1125.

The control message processing unit 1105 is configured to receive and process a variety of control messages. If the received control message contains information that instructs switching of a transmission mode, the control message processing unit 1105 controls the transceiver 1125 in order to switch a transmission mode to an instructed mode.

The second layer unit 1115 refers generically to an RLC unit, an MAC unit, etc. The second layer unit 1115 allows upper layer data such as a third layer control message to be framed to suitable sizes.

Also, the second layer unit 1115 applies an automatic retransmission operation and offers a multiplexing function. In addition, the second layer unit 1115 restores data, received from the retransmission unit 1117, to original upper layer data and delivers it to a suitable upper layer.

The retransmission unit 1117 is composed of several HARQ processes and performs an HARQ operation. Data received from the second layer unit 1115 is stored in an arbitrary HARQ process, transmitted, and retransmitted. In addition, the retransmission unit 1117 stores data received from the transceiver 1125 in some HARQ process, and performs soft combining of retransmitting data and stored data. Successfully received data is delivered to the second layer unit 1115.

The retransmission unit 1117 performs HARQ transmission according to adaptive retransmission technique and non-adaptive retransmission technique. As discussed above, an adaptive retransmission technique is to perform retransmission through transmission resources separately allotted by the base station, and a non-adaptive retransmission technique is to perform retransmission through transmission resources such as predefined semi-persistent resources.

More particularly, the retransmission unit 1117 in this exemplary embodiment discards data stored in an HARQ process under the control of the transmission control unit 1110 when transmission resources for retransmission conflict with each other in a bundling mode.

The grant processing unit 1120 analyzes a certain grant received through a wireless channel and finds allotted transmission resources and MCS level. By using them, the grant processing unit 1120 controls the transceiver 1125 to transmit and receive data.

If the transmission control unit 1110 instructs the grant processing unit 1120 to disregard a specific grant, the grant processing unit 1120 controls the transceiver 1125 not to perform uplink transmission by a corresponding uplink grant.

The transceiver 1125 transmits data, received from the retransmission unit 1117, to a wireless channel. Also, the transceiver 1125 receives a downlink grant or an uplink grant through a wireless channel and delivers it to the grant processing unit 1120. Furthermore, the transceiver 1125 processes data received through a wireless channel and then delivers it to a suitable upper layer.

The transmission control unit 1110 determines an HARQ process based on the time when an uplink grant is received, and further determines whether a conflicting uplink transmission occurs. That is, while performing one bundling transmission which includes a plurality of transmissions for the same data through uplink transmission resources allotted by uplink grant, the transmission control unit 1110 determines whether there is another bundling transmission which conflicts with at least one of the plurality of transmissions.

If there is a conflicting uplink transmission, the transmission control unit 1110 controls the retransmission unit 1117 to discard data in an HARQ process related to the conflicting uplink transmission. If necessary, the transmission control unit 1110 notifies the grant processing unit 1120 to disregard an uplink grant inducing the conflicting uplink transmission.

Additionally, when the execution time of non-adaptive retransmission arrives, the transmission control unit 1110 determines whether there is an uplink transmission which conflicts with non-adaptive retransmission. If there is an uplink transmission conflicting with non-adaptive retransmission, the transmission control unit 1110 controls the retransmission unit 1117 to discard data stored in an HARQ process for non-adaptive retransmission in order to cancel non-adaptive retransmission before it is performed.

In cases where a bundling transmission conflicts with another transmission, the transmission control unit 1110 may control the retransmission unit 1117 and the grant processing unit 1120 in order to stop at least one transmission between the bundling transmission and the other transmission conflicting with the bundling transmission. That is, if there occurs any transmission which conflicts with the bundling transmission, the transmission control unit 1110 controls the retransmission unit 1117 to discard a retransmission process by one of the bundling transmission and the conflicting transmission.

Here, the conflicting transmission may be a bundling transmission or a normal transmission. Also, the bundling transmission may be a plurality of bundling transmissions.

Furthermore, if a bundling transmission and a conflicting transmission are allotted to predefined transmission resources, namely, semi-persistent resources, the transmission control unit 1110 controls the retransmission unit 1117 to discard a retransmission process by the bundling transmission.

If two or more bundling transmissions conflict, the transmission control unit 1110 controls the retransmission unit 1117 to perform the bundling transmission by a recently received uplink grant and to stop the other bundling transmission.

While this invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A power headroom information transmitting method in a terminal, the method comprising:
   receiving a Radio Resource Control (RRC) message including a reference resource information and a reference Modulation and Coding Scheme (MCS) information;
   determining a required transmission power based on the reference resource information and the reference MCS information;
   determining whether to transmit a power headroom information based on a ratio between the required transmission power and a maximum transmission power;
   determining the power headroom information based on the required transmission power; and
   transmitting the power headroom information,
   wherein the reference resource information and the reference MCS information are used for determining the required transmission power before receiving a new RRC message including a new reference resource information or a new reference MCS information.

2. The method of claim 1, wherein determining whether to transmit a power headroom information comprises determining, if the ratio of the required transmission power to the maximum transmission power is higher than a predetermined value, to transmit the power headroom information.

3. The method of claim 1, wherein the reference resource information is a reference amount of transmission resources and the reference MCS information is a reference level of MCS.

4. The method of claim 1, wherein the reference resource information and the reference MCS information are used for determining the required transmission power at least two times.

5. A terminal for transmitting power headroom information, the terminal comprising:
   a control message processing unit for receiving a Radio Resource Control (RRC) message including a reference resource information and a reference Modulation and Coding Scheme (MCS) information; and
   a PHR creation unit for determining a required transmission power based on the reference resource information and the reference MCS information, for determining whether to transmit a power headroom information based on a ratio between the required transmission power and a maximum transmission power, for determining the power headroom information based on the required transmission, and for transmitting the power headroom information,
   wherein the reference resource information and the reference MCS information are used for determining the required transmission power before receiving a new RRC message including a new reference resource information or a new reference MCS information.

6. The terminal of claim 5, wherein the PHR creation unit determines, if the ratio of the required transmission power to the maximum transmission power is higher than a predetermined value, to transmit the power headroom information.

7. The terminal of claim 5, wherein the reference resource information is a reference amount of transmission resources and the reference MCS information is a reference level of MCS.

8. The terminal of claim 5, wherein the reference resource information and the reference MCS information are used for determining the required transmission power at least two times.

9. A power headroom information receiving method in a base station, the method comprising:
   creating a Radio Resource Control (RRC) message including a reference resource information and a reference Modulation and Coding Scheme (MCS) information;
   transmitting the created RRC message to a terminal; and
   receiving a power headroom information from the terminal,
   wherein the terminal uses the reference resource information and the reference MCS information for determining a required transmission power before receiving a new RRC message including a new reference resource information or a new reference MCS information;
   wherein the terminal receives the RRC message, determines the required transmission power based on the reference resource information and the reference MCS information, determines whether to transmit the power headroom information based on a ratio between the required transmission power and a maximum transmission power, determines the power headroom information based on the required transmission power, and transmits the power headroom information.

10. The method of claim 9, wherein the terminal determines, if the ratio of the required transmission power to the maximum transmission power is higher than a predetermined value, to transmit the power headroom information.

11. The method of claim 9, wherein the reference resource information is a reference amount of transmission resources and the reference MCS information is a reference level of MCS.

12. The method of claim 9, wherein the reference resource information and the reference MCS information are used for determining the required transmission power at least two times.

13. A base station for receiving power headroom information, the base station comprising:
- a control message processing unit for creating a Radio Resource Control (RRC) message including a reference resource information and a reference Modulation and Coding Scheme (MCS) information, and for transmitting the created RRC message to a terminal; and
- a transceiver for receiving a power headroom information from the terminal, wherein the terminal uses the reference resource information and the reference MCS information for determining a required transmission power before receiving a new RRC message including a new reference resource information or a new reference MCS information; wherein the terminal receives the RRC message, determines the required transmission power based on the reference resource information and the reference MCS information, determines whether to transmit the power headroom information based on a ratio between the required transmission power and a maximum transmission power, determines the power headroom information based on the required transmission power, and transmits the power headroom information.

14. The base station of claim 13, wherein the terminal determines, if the ratio of the required transmission power to the maximum transmission power is higher than a predetermined value, to transmit the power headroom information.

15. The base station of claim 13, wherein the reference resource information is a reference amount of transmission resources and the reference MCS information is a reference level of MCS.

16. The base station of claim 13, wherein the reference resource information and the reference MCS information are used for determining the required transmission power at least two times.

* * * * *